Nov. 19, 1957 E. H. GARWOOD 2,813,366
FISHING LURE
Filed March 5, 1956

INVENTOR.
ERNEST H. GARWOOD,
BY
ATTORNEY.

United States Patent Office 2,813,366
Patented Nov. 19, 1957

2,813,366

FISHING LINE

Ernest H. Garwood, Long Beach, Calif.

Application March 5, 1956, Serial No. 569,481

2 Claims. (Cl. 43—42.33)

This invention relates to a fishing lure, and particularly to the type of lure which produces a scintillating effect in the water and does not rely upon shape, color, or external appearance or the like to attract a fish.

An object of my invention is to provide a novel fishing lure in which a definite scintillating effect is produced by the light reflected therefrom and, further, that most of the light which falls upon the lure is reflected downwardly to attract the fish which are below the lure. Under normal conditions the lure is above the fish, that is, adjacent the surface of the water and, consequently, if a greater part of the reflecting light is directed downwardly then there is greater likelihood of the fish seeing this reflecting scintillating light and to be attracted thereby.

Another object of my invention is to provide a novel fishing lure in which a plurality of bands are provided which extend longitudinally of the lure and which have a reflecting surface on the bottom of each band only, these bottom surfaces reflecting the light downwardly rather than upwardly.

Another object of my invention is to provide a novel fishing lure in which the reflecting bands are helically shaped and may be positioned or mounted on a frustro conical or bulbous shaped body formed of a transparent material.

Other objects, advantages and features of invention may appear from the accompanying drawing, the subjoined detailed description and the appended claims.

Figure 1:
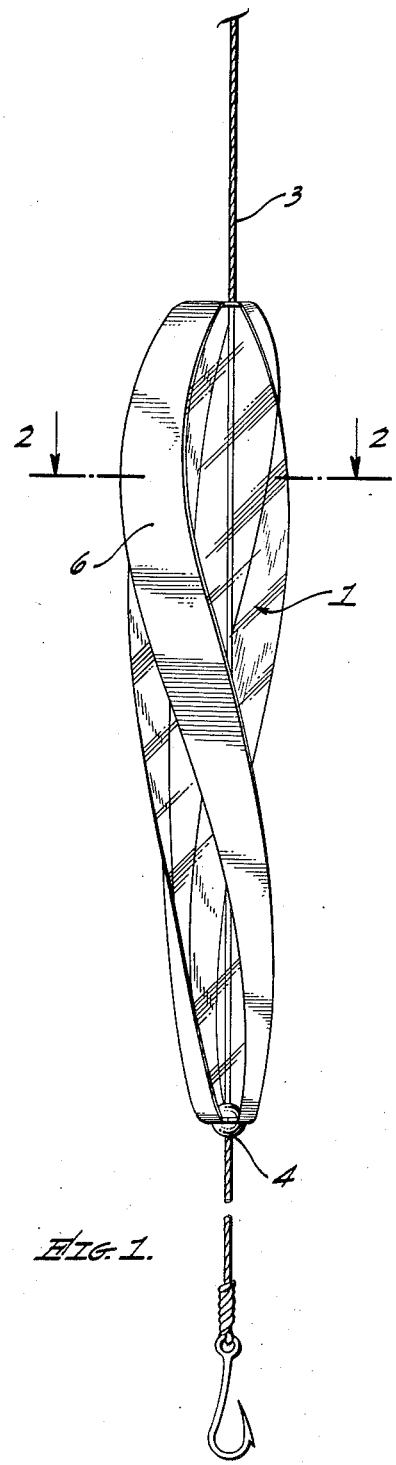
Figure 1 is a side elevation of my fishing lure.
Figure 2:
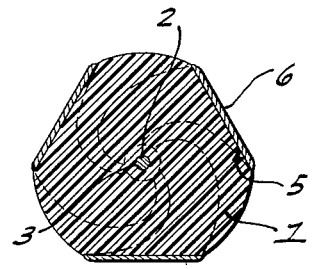
Figure 2 is a sectional view taken on line 2—2 of Figure 1.
Figure 3:
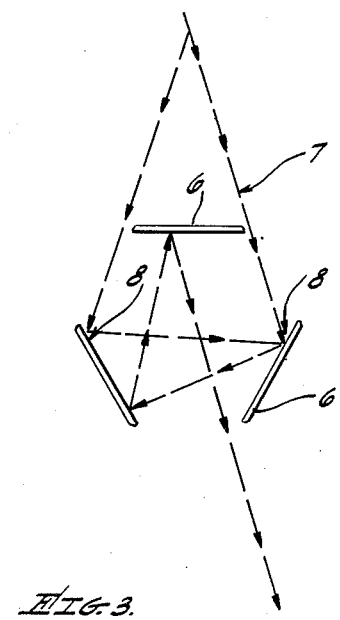
Figure 3 is a diagrammatic transverse sectional view showing the reflecting of light from the under surfaces of the reflecting strips.

Referring more particularly to the drawing, the numeral 1 indicates a body formed of a transparent material, such as certain of the plastics. The body 1 is preferably frustro conical or bulbous in shape, in that it curves continuously from one end to the other and swells to a maximum diameter and then decreases towards each end. A central hole 2 in the body permits the fishing line 3 to pass therethrough. The body 1 may be rotatably mounted on the line 3 and if rotation is permitted then suitable bearings or swivels 4 may be provided at the end of the body, these swivels being of the usual and well known type. The surface of the body 1 may be formed with flat planes 5 which are preferably helical in shape. On each of the planes or surfaces 5 I position a metallic strip 6, such as an aluminum strip. The upper surfaces of each of the strips 6 are coated or formed to produce a nonreflecting surface, that is, they may be painted or coated so that these upper surfaces do not reflect an appreciable amount of light. Furthermore, there is no particular color on the upper surface of the strip 6 other than perhaps a color simulating the skin of a fish. The lower surfaces of each of the strips 5 are highly reflective so that the light rays 7, as shown in Figure 3, strike these lower surfaces 8 and are reflected downwardly through the water, thus attracting any fish which might be below the lure.

Since a lure is normally operated adjacent the surface of the water, and since fish are normally below the lure, it is important that most of the reflected light shall be thrown downwardly. The frustro conical or bulbous or tapered body as it rotates will cause the downwardly reflected light to move or scintillate, thus attracting the attention of any fish which might be in the area. Since the body 1 is perfectly transparent the light will readily pass therethrough to engage the bottom reflecting surfaces 8, thereby reflecting the light at an angle downwardly instead of reflecting the light upwardly, as would be the case if the upper surfaces of the strips 6 were the reflecting surfaces. In a water media all of the light is obtained from above and, consequently, the reflection of light is substantially as shown in Figure 3, and consequently strikes the lower surfaces of the reflecting strips 6, substantially as described. The strips 6 may also be formed of a metallic coating with its under surface being highly reflective to light instead of a solid metallic strip, as previously described. Also the transparent body 1 may be eliminated on occasions, and in that case the strips 6 are formed of a self supporting metal which are helically shaped, as previously described.

Having described my invention, I claim:

1. A fishing lure comprising an elongated body, a plurality of elongated strips embedded on the surface of said body and extending throughout the length of the body, the lower surfaces of said strips being reflective to light and the upper surfaces of said strips being nonreflective, said body being formed of transparent material.

2. A fishing lure comprising an elongated tapered surface of the body, a plurality of metallic strips on the body, said strips being helically shaped, the lower surface of each of said strips being reflective to light and the upper surfaces being nonreflective, said body being formed of a transparent material.

References Cited in the file of this patent

UNITED STATES PATENTS

| 323,111 | Chapman | July 28, 1885 |
| 1,831,176 | Horber | Nov. 10, 1931 |
| 2,708,806 | Siebert | May 24, 1955 |